United States Patent
Nikolov et al.

(10) Patent No.: US 9,791,565 B2
(45) Date of Patent: Oct. 17, 2017

(54) MULTI-FACED ULTRASOUND TRANSDUCER ELEMENT

(71) Applicant: B-K Medical APS, Herlev (DK)

(72) Inventors: Svetoslav I. Nikolov, Farum (DK); Jens M. Hansen, Kobenhavn N (DK); Henrik Jensen, Bagsvaerd (DK)

(73) Assignee: B-K Medical Aps, Herlev (DK)

(*) Notice: Subject to any disclaimer, the term of this patent is extended or adjusted under 35 U.S.C. 154(b) by 119 days.

(21) Appl. No.: 14/763,393

(22) PCT Filed: Jan. 31, 2013

(86) PCT No.: PCT/IB2013/000121
§ 371 (c)(1),
(2) Date: Jul. 24, 2015

(87) PCT Pub. No.: WO2014/118588
PCT Pub. Date: Aug. 7, 2014

(65) Prior Publication Data
US 2015/0369916 A1    Dec. 24, 2015

(51) Int. Cl.
*G01S 15/89* (2006.01)
*G01S 7/52* (2006.01)
*B06B 1/06* (2006.01)
*G10K 11/32* (2006.01)

(52) U.S. Cl.
CPC ........ *G01S 15/8929* (2013.01); *B06B 1/0607* (2013.01); *G01S 7/52079* (2013.01); *G01S 15/894* (2013.01); *G01S 15/8915* (2013.01); *G01S 15/8945* (2013.01); *G01S 15/8997* (2013.01); *G10K 11/32* (2013.01)

(58) Field of Classification Search
CPC ............. G01S 15/8945; G01S 15/8915; G01S 15/8997; G01S 7/52079; G01S 15/8929; G01S 15/894; B06B 1/0607; G10K 11/32
See application file for complete search history.

(56) References Cited

U.S. PATENT DOCUMENTS

| | | | | |
|---|---|---|---|---|
| 4,216,537 A * | 8/1980 | Delignieres | ............. | G01S 15/60 367/106 |
| 5,412,618 A * | 5/1995 | Gilmour | ............... | G10K 11/355 367/104 |
| 5,577,006 A * | 11/1996 | Kuc | ........................ | G01S 15/66 367/103 |
| 5,640,369 A * | 6/1997 | Capell, Sr. | .......... | G01S 7/52004 367/88 |
| 5,781,504 A * | 7/1998 | Manning | ................. | G01S 15/42 367/103 |

(Continued)

FOREIGN PATENT DOCUMENTS

| | | | | |
|---|---|---|---|---|
| EP | 2951034 A1 * | 12/2015 | ......... | G01S 15/8945 |
| WO | WO 2014118588 A1 * | 8/2014 | ......... | G01S 15/8945 |

*Primary Examiner* — Daniel Pihulic
(74) *Attorney, Agent, or Firm* — Anthony M. Del Zoppo, III; Driggs, Hogg, Daugherty & Del Zoppo Co. LPA (57) ABSTRACT

An imaging system (300) includes a transducer array (308) with a transducer element (310) with at least two faces (402, 904). Each face faces a different direction. The transducer element includes at least two sub-elements (404, 902). Each sub-element is part of a different face. The at least two sub-elements transmit respective beams at each location along a scan path (806).

22 Claims, 7 Drawing Sheets

(56) References Cited

U.S. PATENT DOCUMENTS

| | | | | |
|---|---|---|---|---|
| 6,102,860 | A * | 8/2000 | Mooney | A61B 8/08 |
| | | | | 128/916 |
| 7,046,582 | B1 * | 5/2006 | Kosalos | G01S 7/52003 |
| | | | | 367/103 |
| 7,242,638 | B2 * | 7/2007 | Kerfoot | G01S 15/8904 |
| | | | | 367/12 |
| 2002/0050169 | A1 * | 5/2002 | Ritter | G01S 7/52046 |
| | | | | 73/606 |
| 2006/0058707 | A1 * | 3/2006 | Barthe | A61N 7/022 |
| | | | | 601/2 |
| 2012/0143063 | A1 * | 6/2012 | Robinson | A61B 8/00 |
| | | | | 600/472 |
| 2015/0369916 | A1 * | 12/2015 | Nikolov | G01S 15/8945 |
| | | | | 367/7 |
| 2016/0207602 | A1 * | 7/2016 | Clark | G01S 15/89 |

\* cited by examiner

MULTI-FACED ULTRASOUND TRANSDUCER ELEMENT

RELATED APPLICATION

This application is a national filing of PCT application Serial No. PCT/IB2013/000121, filed Jan. 31, 2013, published as WO2014/118588 on Aug. 7, 2014. This application claims priority to PCT application Serial No. PCT/IB2013/000121, published as WO2014/118588 on Aug. 7, 2014.

TECHNICAL FIELD

The following generally relates to ultrasound and more particularly to a multi-faced ultrasound transducer element, and is described with particular application to ultrasound imaging.

BACKGROUND

Figure 1:
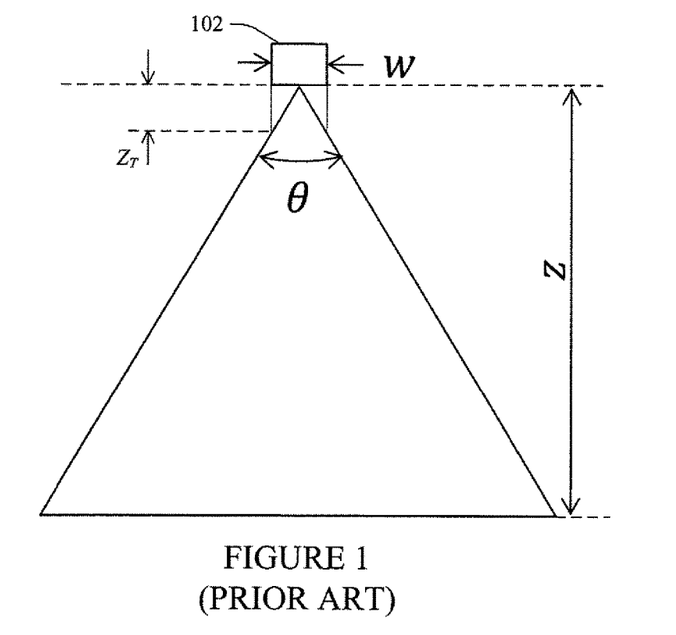
FIG. 1 schematically illustrates a prior art single transducer element.

Ultrasound (US) imaging has provided useful information about the interior characteristics of an object or subject under examination. An ultrasound imaging system has included an ultrasound probe that houses a transducer array including one or more transducer elements. FIG. 1 shows an example of a single transducer element 102 with a width "w" and an acceptance angle θ at an imaging depth of "z".

In B-mode imaging, the transducer array transmits a radio-frequency pulse of wavelength λ into a scan field of view. As the pulse traverses the medium of the object or subject, portions of the pulse are attenuated, scattered, and/or reflected off structure boundaries present in the medium. Some of the reflections (echoes) traverse back to the transducer elements 102, being received thereby. The echoes correspond to an axial slice through the object or subject and are processed to generate scan lines, which are used to produce a scan plane, or a two dimensional image of the slice.

The transducer in FIG. 1 is not focused and the wave close to the transducer surface is planar. The wave starts to diverge at depth $z_T$, where the distance can be roughly estimated as shown in Equation 1:

$$z_T \sim \frac{1}{4}\frac{w^2}{\lambda}. \qquad \text{Equation 1}$$

The depth beyond $z_T$ is generally referred to as the far-field and the wave starts to diverge. For a rectangular aperture, the angle of divergence in the far field θ referred also as acceptance angle can be roughly estimated as shown in Equation 2:

$$\sin\left(\frac{\theta}{2}\right) \sim \frac{\lambda}{w}. \qquad \text{Equation 2}$$

Figure 2:
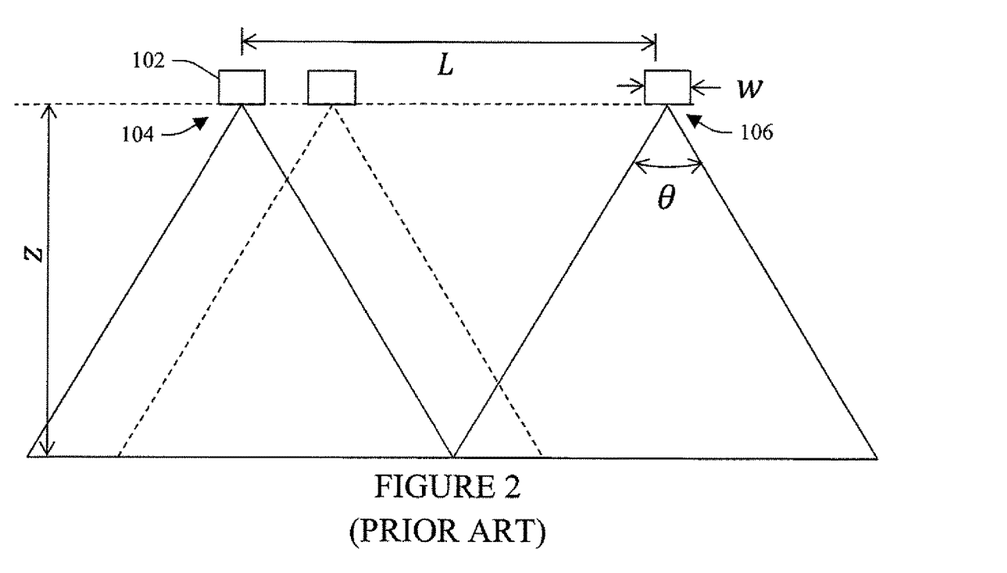
FIG. 2 schematically illustrates prior art movement of the single transducer element of FIG. 1 in connection with B-mode imaging using a synthetic aperture.

B-mode imaging has been combined with synthetic aperture imaging. With synthetic aperture imaging, the transducer element 102 translates along a scan path and transmits pulses at predetermined different locations on the scan path and the received echoes from the different transmissions are combined, for example, the signals are delayed and summed in phase, to produce an image. This is shown in FIG. 2 in which the transducer element 102 translates between first and second locations 104 and 106. The synthesized aperture length, "L," directly depends on the acceptance angle θ and the imaging depth "z" as shown in Equation 3:

$$L = 2z\tan\frac{\theta}{2}. \qquad \text{Equation 3}$$

The beam pattern of the synthesized array using monostatic synthetic aperture focusing can be approximated at the focus as described in S. Nikolov, Synthetic Aperture Tissue and Flow Ultrasound Imaging, Ph.D. dissertation, 2001, Technical University of Denmark and as shown in:

$$\frac{\sin\left[\frac{2\pi}{\lambda}L\sin\theta\right]}{\frac{2\pi}{\lambda}L\sin\theta}. \qquad \text{Equation 4}$$

Using small angle approximation (sin θ≈tan θ≈θ, valid for angles below 5 degrees), it can be shown that the 3 dB beamwidth can be approximated as shown in Equation 5:

$$b_{3dB} = C\lambda\frac{z}{L}, \qquad \text{Equation 5}$$

where C is a constant that generally depends on the weights applied to the signals prior to summation. As a results, a larger "L" results in a narrower beam which gives better resolution.

From Equation 3 and Equation 5, the larger the acceptance angle θ, the better the resolution. The energy transmitted into the tissue is proportional to the transducer area, so that a larger "w" results in a better signal to noise ratio. Unfortunately, a larger "w" corresponds to a smaller acceptance angle θ, and, thus, poorer resolution.

SUMMARY

Aspects of the application address the above matters, and others.

In one aspect, an imaging system includes a transducer array with a transducer element with at least two faces. Each face faces a different direction. The transducer element includes at least two sub-elements. Each sub-element is part of a different face. The at least two sub-elements transmit respective beams at each location along a scan path.

In another aspect, a method includes positioning a transducer array at a scan position along a scan path. The transducer array includes at least one transducer element having at least two sub-elements facing different directions. The method further includes exciting each of the sub-elements to transmit and receive with the array at the scan position. The method further includes processing the received data using a synthetic aperture algorithm.

In another aspect, a transducer array includes a transducer element with at least two sub-elements arranged on different faces of the transducer element, each sub-element face facing a different direction, wherein the at least two sub-elements transmit and receive at each location along a scan path, and processing the received data using a synthetic aperture algorithm.

Those skilled in the art will recognize still other aspects of the present application upon reading and understanding the attached description.

BRIEF DESCRIPTION OF THE DRAWINGS

The application is illustrated by way of example and not limitation in the figures of the accompanying drawings, in which like references indicate similar elements and in which.

DETAILED DESCRIPTION

Figure 3:
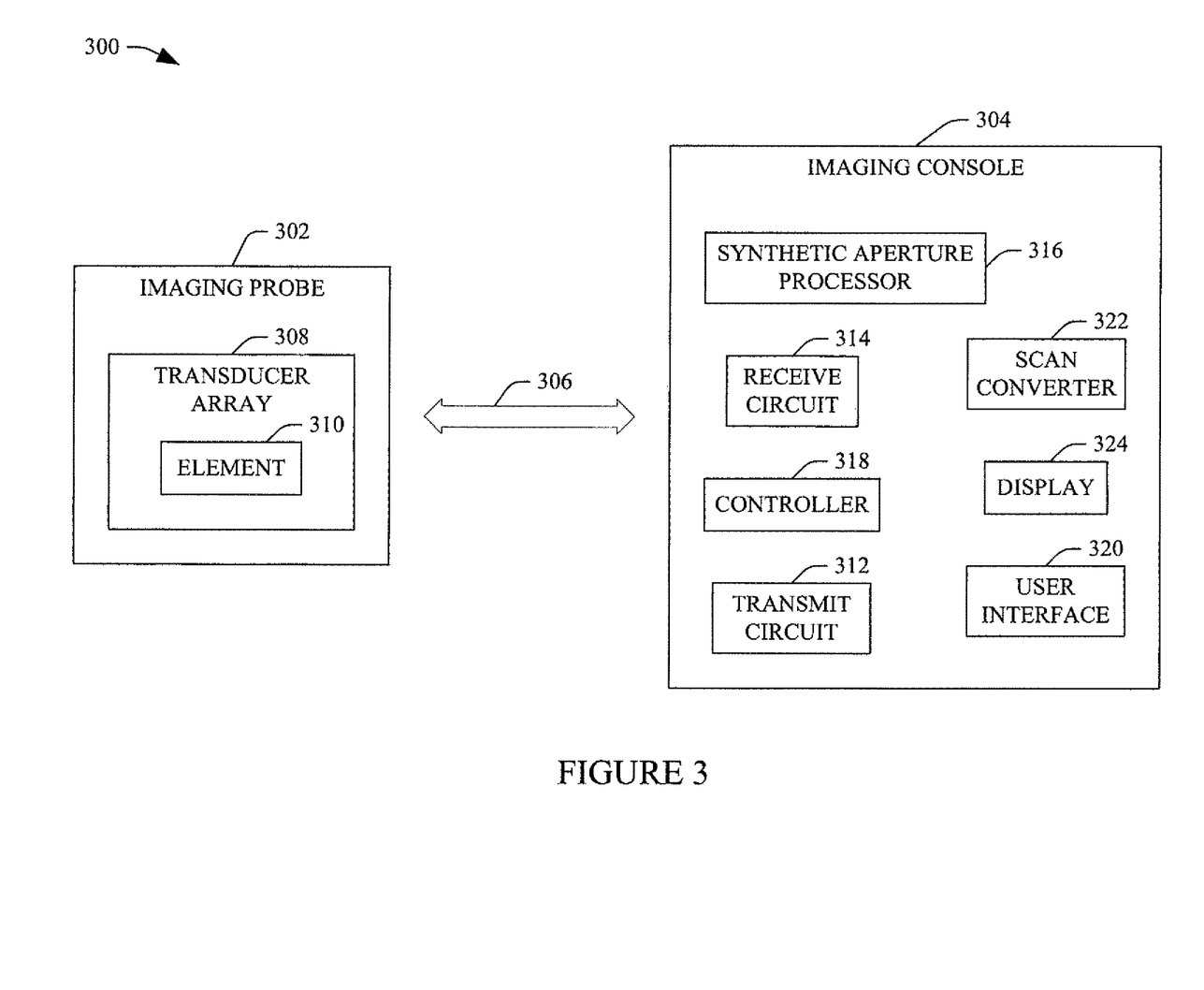
FIG. 3 schematically illustrate an example imaging system in connection with a transducer array with at least one multi-faced transducer element.

FIG. 3 schematically illustrates an imaging system 300 such as ultrasound imaging system.

The imaging system 300 includes an imaging probe 302 and an imaging console 304, which are in electrical communication through a communication channel 306, which can be wired and/or wireless. In a variation, the imaging probe 302 and the imaging console 304 are part of different systems. In such a variation, the imaging probe 302 can communicate with the console 304 and/or another computing device(s). In the latter case, the console 304 can be omitted.

The imaging probe 302 includes a one-dimensional (1D) or two-dimensional (2D) transducer array 308 with one or more transducer (e.g., piezoelectric) elements 310. Suitable configurations include, but are not limited to, linear arrays, curved arrays (e.g., concave, convex, etc.), circular arrays, etc. As described in greater detail below, in one embodiment, at least one of the transducer elements 310 includes multiple faces, each with a sub-element configured to transmit and/or receive independent of the other sub-elements, in which the sub-elements can be excited to transmit and/or receive sequentially and/or concurrently. Such a transducer element 310 can be used to scan a region under investigation or examination in a single pass, while acquiring data for synthetic aperture processing with an extended synthetic aperture length, while maintaining the transducer element acceptance angle θ and improving image resolution. Any redundant data acquired with the sub-elements can be used to increase the signal to noise ratio.

The imaging console 304 includes a transmit circuit 312 that controls excitation of the element 310 and a receive circuit 314 that receives the echoes received by the element 310.

A synthetic aperture processor 316 processes received echoes. Such processing includes beamforming (e.g., delay and sum) the echoes in connection with synthetic aperture imaging B-mode imaging, elastography imaging, etc. The synthetic aperture processor 316 and/or other component may also process the echoes to lower speckle and/or improve specular reflector delineation, and/or perform other processing such as FIR and/or IIR filtering, etc.

A controller 318 of the ultrasound imaging console 304 controls the transmit circuit 312 and/or the receive circuit 314. Such control may include, but is not limited to, controlling the frame rate, number of scan line groups, transmit angles, transmit energies, transmit frequencies, transmit and/or receive delays, the imaging mode, etc.

A user interface 320 includes input and/or output devices for interacting with the controller 318, e.g., to select an imaging mode (e.g., B-mode synthetic aperture). The user interface 320 may include controls such as buttons, knobs, a keypad, a touch screen, etc., and/or one or more visual and/or audible indicators.

A scan converter 322 scan converts the processed echoes and generates data for display, for example, by converting the data to the coordinate system of the display. The scan converter 322 can be configured to employ analog and/or digital scan converting techniques.

A display 324 can be used to present the acquired and/or processed data. Such presentation can be in an interactive graphical user interface (GUI), which allows the user to rotate, scale, and/or otherwise manipulate the displayed data, through a mouse, keyboard, or the like. The display 324 can alternatively be remote from the console 304.

FIGS. 4, 5, 6, 7 and 8 schematically illustrate an example of a single element 310 of the one or more transducer elements 310.

Figure 4:
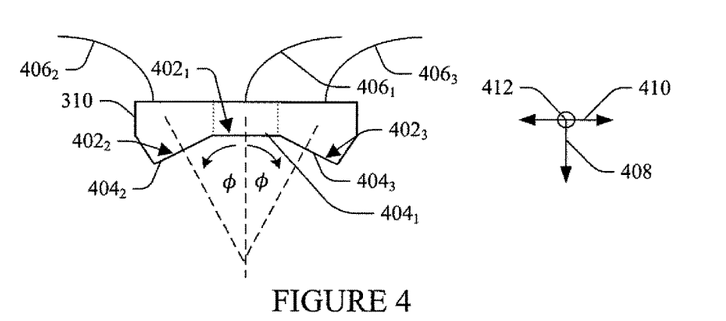
FIG. 4 schematically illustrate an example of the multi-faced transducer element with a sub-element part of each face.

Initially referring to FIG. 4, the single element 310 includes multiple faces, each facing a different direction and each including a different sub-element. For sake of brevity, the illustrated element 310 includes three faces, $402_1$, $402_2$, and $402_3$ (collectively referred to herein as faces 402) and three sub-elements $404_1$, $404_2$, and $404_3$ (collectively referred to herein as sub-elements 404). However, it is to be understood that the single element 310 can include more or less faces and/or sub-elements.

Each of the sub-elements $404_1$, $404_2$, and $404_3$ has a respective electrical connection $406_1$, $406_2$, and $406_3$ (collectively referred to herein as electrical connections 406), which routes electrical signals indicative of the received echoes to the receive circuit 314 (FIG. 3) and/or another component.

Figure 5:
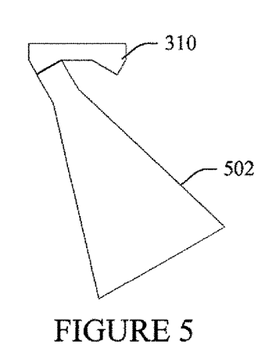
FIG. 5 schematically illustrate an example beam from one of the sub-elements on one of the faces.
Figure 6:
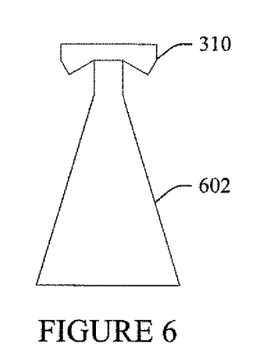
FIG. 6 schematically illustrate an example beam from another sub-element on another face.
Figure 7:
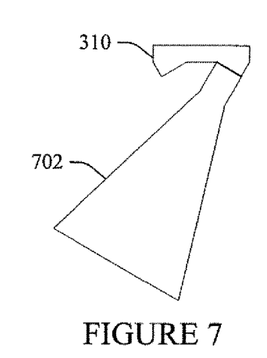
FIG. 7 schematically illustrate an example beam from another sub-element on another face.

The sub-element $404_1$ faces forward in the axial direction 408. The sub-element $404_2$ faces at an angle $\phi$ (e.g., 20-40 degrees, such as 30 degrees) with respect to the sub-element $404_1$. The sub-element $404_3$ faces at the angle negative $\phi$ (e.g., negative 20-40 degrees, such as negative 30 degrees) with respect to the face $402_1$. The sub-elements $404_2$ and $404_3$ can be tilted in an azimuth direction (as shown) 410 or an elevation direction 412. FIGS. 5, 6 and 7 respectively show example beams 502, 602 and 702 for the individual sub-elements $404_2$, $404_1$, and $404_3$.

Figure 8A:
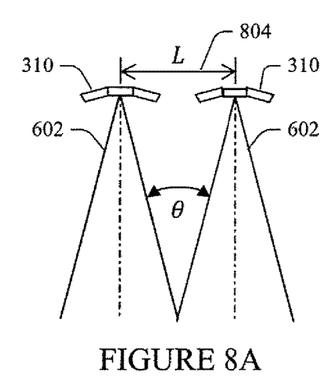
FIG. 8A schematically illustrate a synthetic aperture length of the multi-faced transducer element when using only a single face of the multiple faces.
Figure 8B:
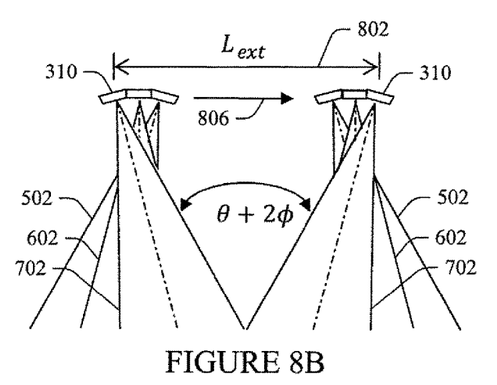
FIG. 8B schematically illustrate an extended synthetic aperture length of the multi-faced transducer element when using more than one face of the multiple faces.

The increase in length of the synthesized aperture using the configuration in FIG. 4 is illustrated in FIGS. 8A and 8B. When only a single face ($402_2$, $402_1$, and $402_3$) of the element 310 is used, as shown in FIG. 8A, then the length 804 of the synthetic aperture is $$L \sim 2z \cdot \tan\frac{\theta}{2}.$$

FIG. 8A illustrates the use of element $404_1$. When all sub-elements from the configuration in FIG. 4 are used, as shown in FIG. 8B, then the synthesized aperture 802 has larger or extended length $$L_{ext} \sim 2z \cdot \tan\left(\phi + \frac{\theta}{2}\right).$$

The scan field of view can be scanned in one pass along scan path 806, with the resulting data processed via a synthetic aperture algorithm, such as a mono-static synthetic aperture algorithm or a poly-static synthetic aperture algorithm. The element 310 can be moved mechanically between each firing sequence with a motor.

With a mono-static synthetic aperture approach, the sub-element $404_1$, $404_2$, and $404_3$ sequentially transmit and receive. The element 310 is then moved to a next position on the scan path 806 and the above sequence (i.e., sequentially transmit and receive) is repeated. Since the resolution of the system is directly proportional to the length of the synthesized aperture, "$L_{ext}$", the resolution is increased relative to operating only a single one of the elements $404_1$, $404_2$, and $404_3$.

The contrast increases with the level of acquired redundant information. With a poly-static synthetic aperture approach, the sub-element $404_1$, $404_2$, and $404_3$ sequentially transmit and all three of the elements $404_1$, $404_2$, and $404_3$ receive with each transmission. With this approach, more redundant information is acquired, allowing for higher contrast relative to the mono-static synthetic aperture approach.

An increased sub-element count (e.g., more than the illustrated three) results in lower lower-side lobes, at the expense of frame-rate (i.e., a larger number of emissions) and potentially lower signal-to-noise ratio. Where none of the sub-elements are focused, the amplitude of the transmitted wave form can be larger than normally used, which may compensate for a decreased signal to noise ratio.

The ultrasound image is treated as a collection of pixels on a grid where the 3D scan coordinates of a pixel p are given in a vector form $\vec{x}_p = [x_p, y_p, z_p]^T$. The value of the pixel I, at location $\vec{x}_p$ can be reconstructed using a delay-and-sum beamforming as shown in Equation 6:

$$I(\vec{x}_p) = \sum_{n=1}^{N} \sum_{m=1}^{M} \sum_{k=1}^{K} a(\vec{x}_m(n), \vec{x}_k(n), \vec{x}_p) \cdot s_{kmn}(\tau(\vec{x}_m(n), \vec{x}_k(n), \vec{x}_p)),$$

Equation 6 where N is the number of discrete positions of the array, m is the index of the transmitting subelement, k is the index of the receiving subelement, $S_{kmn}(t)$ is the signal received by subelement k after transmission by subelement m at position n, a is weighting coefficient (apodization) and $\tau$ is time-of-flight of the ultrasound wave from the transmitting sub-element to the imaged point and back to the receiving subelement.

Both, the time-of-flight and the apodization are functions of the position of the transmitting sub-element $\vec{x}_m(n)$, the receiving sub-element $\vec{x}_k(n)$, and the imaged pixel $\vec{x}_p$. The time-of-flight $\tau$ consists of two components—forward and backward propagation times. The forward propagation time is the time from the start of emission till the wavefront reaches the imaged pixel $\vec{x}_p$. The backward propagation time is from the pixel at location $\vec{x}_p$ to the receiving sub-element at location $\vec{x}_k(n)$.

The computation of the backward propagation time can be found as shown in Equation 7:

$$t_{back} = \frac{|\vec{x}_p - \vec{x}_k(n)|}{c},$$

Equation 7 where c is the speed of sound. Notice that in case of inhomogeneous medium, this can be extended to a multi-layer model with varying speed-of-sound. The calculation of the forward propagation time is based on an assumed propagation model. This can be simulated in a computer program, or measured in a water tank and tabulated. For sub-elements where the width w of the subelement does not exceed 20 wavelengths, the path of the transmitted wave from the transducer surface can be approximated as illustrated in FIG. 20.

Figure 20:
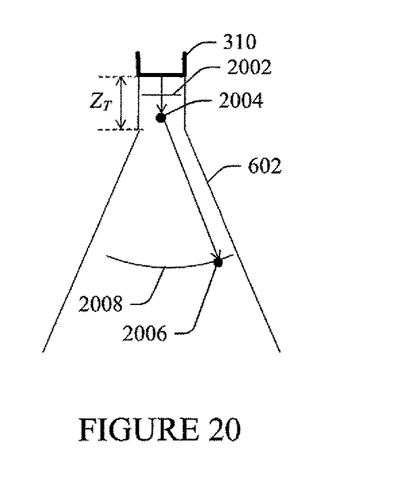
FIG. 20 illustrates the wave propagation model used for delay calculations in the synthetic aperture beamforming.

Briefly turning to FIG. 20, close to the transducer, the wavefront 2002 is planar until it reaches the transition depth $z_T$. Beyond the transition depth, the wavefront 2008 is convex and can be approximated by a sphere whose center is located at a virtual source 2004. The coordinate of the virtual source relative to the center of the sub-element is $\vec{x}_v = [x_v, y_v, z_v]^T$. To find the transmit propagation time, the coordinate of the imaged pixel 2006 is transformed to a local coordinate system whose origin is at the center of the transmitting sub-element.

The coordinate of the pixel 2006 relative to center of transmitting element with index m at position n is $\vec{x}_p(n,m)=[x_p(n,m),y_p(n,m),z_p(n,m)]^T$. The time of flight can be found from Equation 8:

$$t_{frd} = \begin{cases} z_p(n,m) \leq z_T, & \dfrac{z_p(m,n)}{c} \\ z_p(n,m) > z_T & \dfrac{|z_v|+|\vec{x}_p(m,n)-\vec{x}_v|}{c} \end{cases} \quad \text{Equation 8}$$

The signal to noise ratio can also be increased by transmitting every time on all sub-element $404_1$, $404_2$, and $404_3$ and using spatial encoding such as Hadamard encoding or frequency division. Such encoding is discussed in Chiao et al., "Sparse array imaging with spatially-encoded transmits," pp. 1679-1682 (1997), Nikolov et al., "Comparison between different encoding schemes for synthetic aperture imaging," In Proc. SPIE-Progress in biomedical optics and imaging, Vol. 3, pp. 1-12 (2002), and Gran et al., "Spatial encoding using code division for fast ultrasound imaging," IEEE Trans Ultrason Ferroelectr Freq Control, Vol. 55, Iss. 1, pp. 12-23 (2008).

Figure 9:
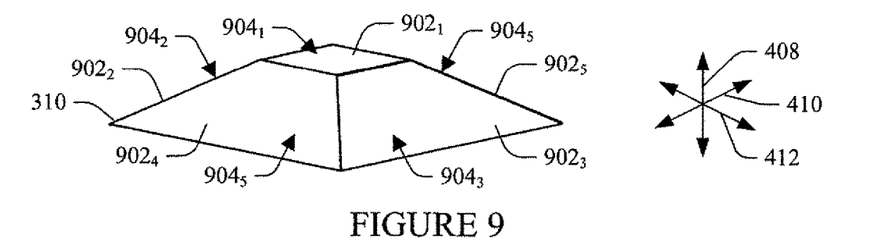
FIG. 9 schematically illustrate a three dimensional version of the multi-faced transducer element.

The element shown in FIG. 9 has a three-dimensional (3D) imaging geometry and can be used for imaging axial 408, azimuth 410, and elevation 412.

More particularly, in this example, the element 310 includes five (5) sub-elements $902_1$, $902_2$, $902_3$, $902_4$, and $902_5$ (collectively referred to herein as sub-elements 902), and each on a respective face $904_1$, $904_2$, $904_3$, $904_4$, and $904_5$ (collectively referred to herein as faces 904. The sub-element $902_1$ faces forward in the axial direction 408, the sub-elements $902_2$ and $902_3$ are tilted at an angle in the azimuth plane 906, and the sub-elements $902_4$ and $902_5$ are titled at an angle in the elevation plane 908, Generally, a minimum number of sides is three (3) or four (4) for symmetry. Having the forward looking sub-element $902_1$ gives an extra dimension of redundancy that may decrease the side lobes and increase the contrast in the image. However, it should be understood that theoretically there is no upper limit on the number of sides in such a configuration.

The element 310 in FIG. 9 can be operated as discussed herein in connection with FIG. 3 and/or otherwise. The beamforming follows the procedure described in Equation 6, Equation 7 and Equation 8, and/or other approach.

Figure 10:
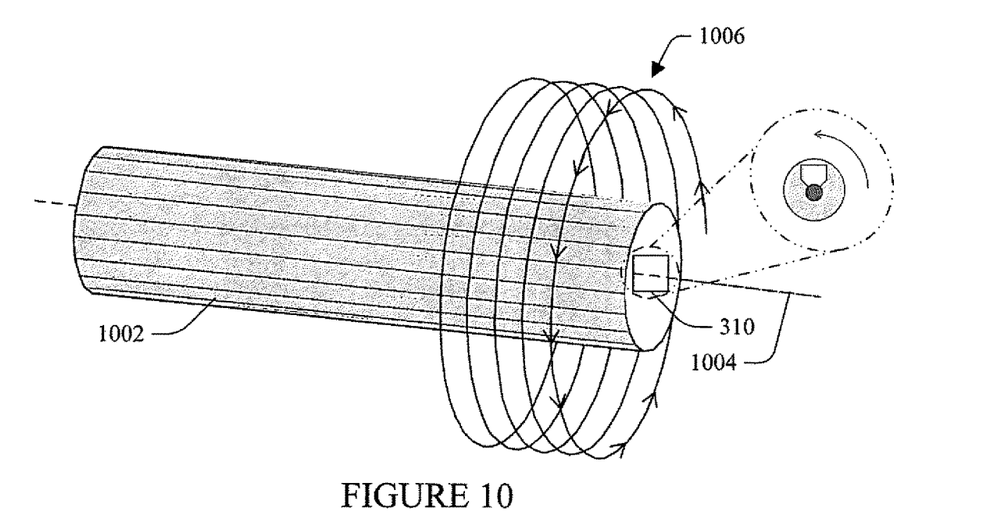
FIG. 10 schematically illustrate a 360 degree transducer that includes a multi-faced transducer element.
Figure 11:
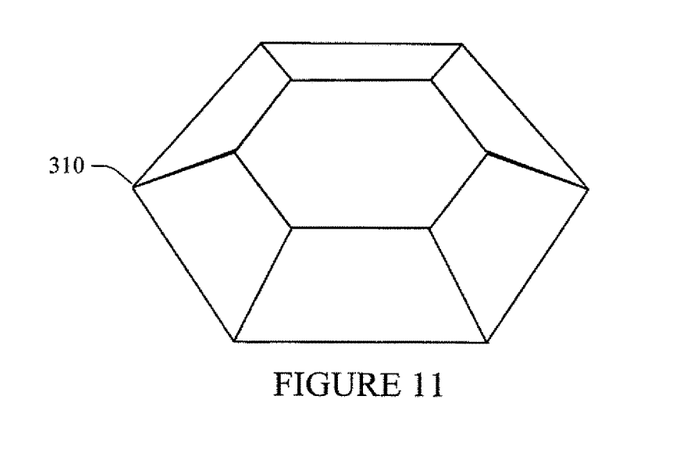
FIG. 11 schematically illustrate an example multi-faced transducer element that can be employed with the transducer of FIG. 10.

FIG. 10 illustrates another configuration in which the transducer element 310 can be employed. This configuration is well-suited for high-resolution 3D, 360 degree volume scanning. The element 310 is shown as a black box as various geometries can be employed. For example, the element 310 can be as shown in FIG. 3, 9 or 11 (which has seven (7) sides), otherwise (e.g., pyramidal, tetrahedral, etc.), and/or a combination thereof.

In this example, the transducer element 310 is supported in an elongate tubular housing 1002. The housing 1002 and hence the element 310 is configured to rotate about a rotational axis 1004, which extends along a long axis of the housing 1002, and translate (in a single direction or back and forth) along the rotational axis 1004 and long axis of the housing 1002. The data can be conveyed from the housing 1002 through a slip ring, wirelessly, etc.

When rotating and translating, the resulting trajectory is a helix 1006. The sides of the transducer look in different directions allowing for the collection of data both in azimuth and elevation directions. An example of a synthetic aperture beamforming approach for this configuration is discussed in Andresen et al., "Synthetic aperture focusing for a single element transducer undergoing spiral motion," Vol. 58, Iss. 5, pp. 935-943 (2011).

FIGS. 12, 13, 14 and 15 show example multi-row embodiments in which the multi-faced transducer elements 310 can be employed. Generally, a multi-row transducer with rows tilted at different angles in elevation direction will increase the size of the synthesized aperture in elevation direction.

Figure 12:
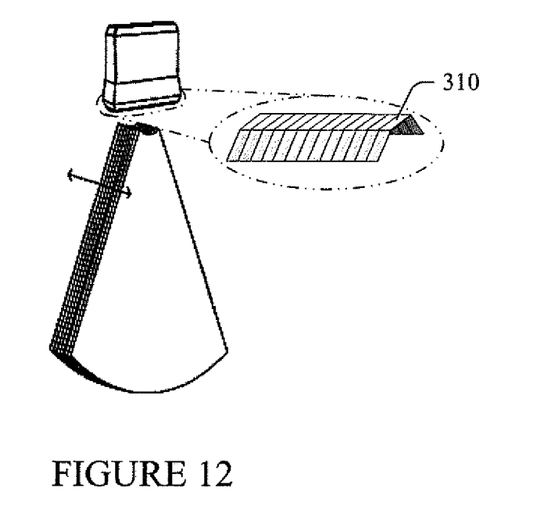
FIG. 12 schematically illustrates a sector scan setup configured for 4D imaging via translating the transducer array in which the transducer array includes a row of multi-faced transducer elements.

FIG. 12 shows a sector scan setup configured for 4D imaging via translating the transducer array in which the transducer array includes a row of multi-faced transducer elements. The sector scan setup can be made using either a phased array transducer (shown) or a curved array.

Figure 13:
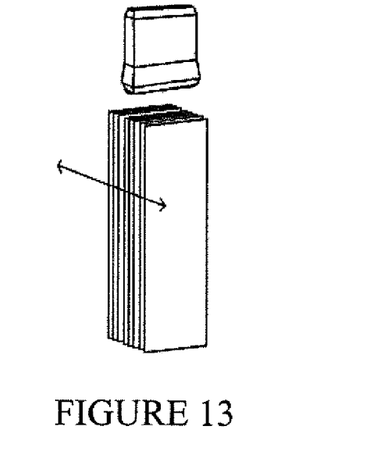
FIG. 13 schematically illustrates a linear array transducer array configured for 4D imaging via translating the transducer array in which the transducer array includes a row of multi-faced transducer elements.

FIG. 13 shows a linear transducer array. Both the sector scan setup and linear transducer array can be translated for 4D scanning (as shown) or held at a static position for 2D and/or 3D imaging.

Figure 14:
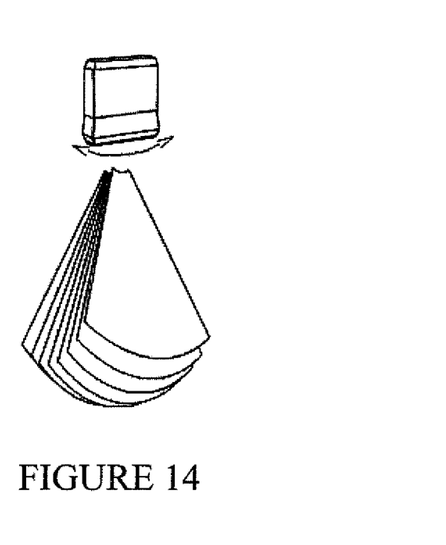
FIG. 14 schematically illustrates a sector scan setup configured for 4D imaging via wobbling the transducer array in which the transducer array includes a row of multi-faced transducer elements.
Figure 15:
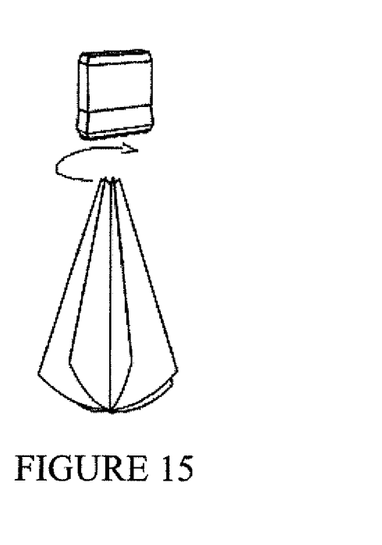
FIG. 15 schematically illustrates a curved array transducer array configured for 4D imaging via rotating the transducer array in which the transducer array includes multiple rows of multi-faced transducer element.

FIG. 14 shows a sector scan setup configured for 4D imaging via wobbling the transducer array in which the transducer array includes a row of multi-faced transducer elements. The array can be either a phased array as shown in the figure or a curved array. The sector scan setup is used in connection with a rocking or wobbling motion instead of translation (FIG. 12). FIG. 15 shows the sector scan setup connection with rotational motion instead of translation (FIG. 12).

For these embodiments, the synthetic aperture processing approach discussed in the following can be employed to process the acquired data: Nikolov et al., "3D synthetic aperture imaging using a virtual source element in the elevation plane, Vol. 2, pp. 1743-1747 (2000), Andresen et al., "Rocking convex array used for 3D synthetic aperture focusing," pp. 970-973 (2008), and Andresen et al., "Three-dimensional synthetic aperture focusing using a rocking convex array transducer," Vol. 57, Iss. 5, pp. 51-63 (2010).

Figure 16:
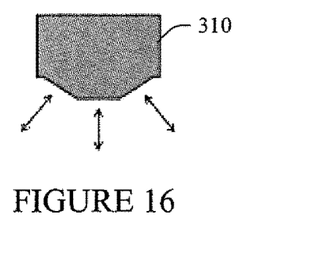
FIG. 16 schematically illustrates a variation of the multi-faced transducer element that includes a convex transmitting surface.

In FIG. 4, the transducer element 310 is concave. Alternatively, FIG. 16 shows a variation in which the transducer element 310 is convex. With the concave configuration of FIG. 4, the overlapping scan regions can be used, for example, in connection with a poly-static synthetic aperture for focusing.

The convex transducer element 310 of FIG. 16 provides little to no overlap between the fields of view of the individual sides. As such, each side can be used in a mono-static manner. On the other hand, the beam separation of the convex geometry can potentially enable simultaneous acquisition of data from all directions. Other geometries are also contemplated herein.

Figure 17:
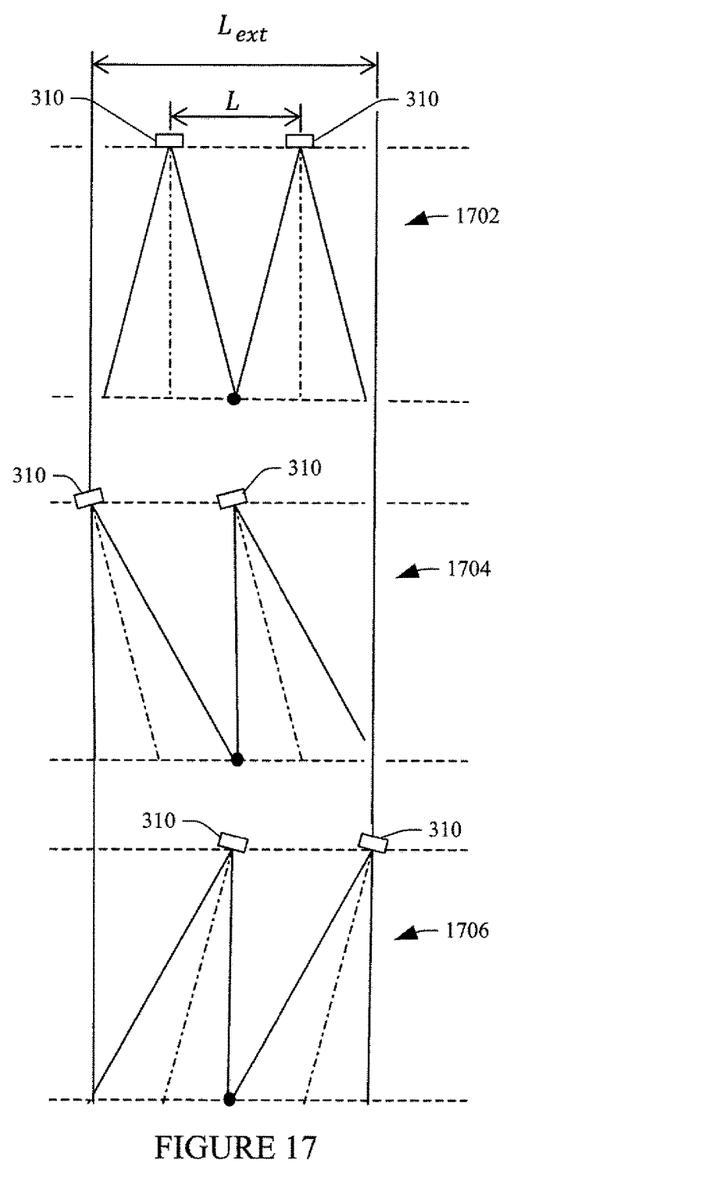
FIG. 17 schematically illustrates another embodiment.

FIG. 17 shows a variation in which the transducer element 310 includes only a signal sub-element, which is configured to tilt. With this configuration, the field of view is scanned over three separated passes. For one pass, the transducer element 310 looks directly forward. This is shown at 1702. For another pass, the transducer element 310 is tilted θ=30 degrees. This is shown at 1704. For another pass, the transducer element 310 is tilted θ=30 degrees. This is shown at 1706.

The illustrated ordering of the passes is not limiting, and the particular ordering can be any combination of those shown. Tilting and translating while scanning extend the synthetic aperture from "L" to "$L_{ext}$". This is similar to the configuration shown in FIGS. 4-8 with the three sub-element configuration with two faces angled θ with respect to a forward looking face when θ=±30 degrees in FIGS. 4-8. In other embodiments, θ can be greater or less than 30 degrees.

Such a multiple-pass system is well-suited for applications where the target is stationary, such as non-destructive testing, etc. Tilting can be achieved with an actuator or a motor.

The beamforming in this multi-pass system can again be based on delay-and-sum focusing as shown in Equation 9:

$$I(\vec{x}_p) = \sum_{l=1}^{L} \sum_{n=1}^{N} a(\vec{x}_p(l, n)) \cdot s_{l n}(\tau(\vec{x}_p(l, n))),  \quad \text{Equation 9}$$

where L is the number of passes, N is the number of discrete positions during a pass, $a(\bullet)$ is apodization coefficient, $\tau(\bullet)$ is time-of-flight from the element to the imaged point and back, $s_{ln}(\bullet)$ is the received signal by the element at position n during pass l, and $\vec{x}_p(l,n)$ is the imaged pixel whose position is expressed in a local-coordinate system relative to the position of the transducer element 310 at emission n during pass l. The backward and forward propagation times can be found using Equation 5 and Equation 6 respectively and/or other approach.

Figure 18:
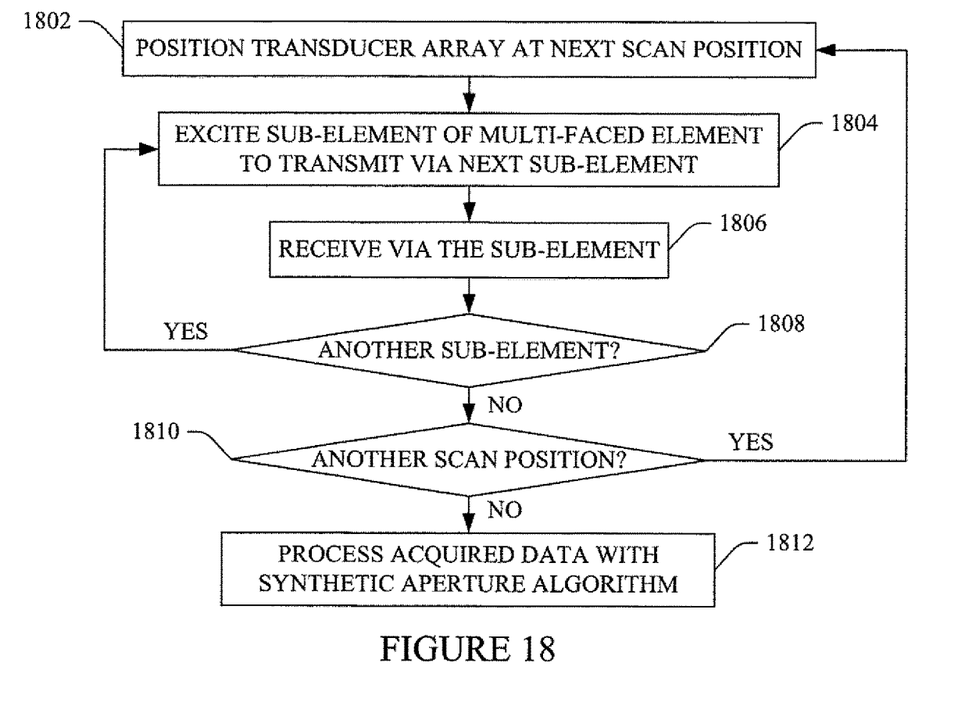
FIG. 18 illustrates an example method in accordance with the embodiments herein.

FIG. 18 illustrates a method based on the mono-static synthetic aperture approach.

It is to be appreciated that the order of the following acts is provided for explanatory purposes and is not limiting. As such, one or more of the following acts may occur in a different order. Furthermore, one or more of the following acts may be omitted and/or one or more additional acts may be added.

At 1802, the transducer array 308 is positioned at a next scan position on a scan path.

At 1804, a sub-element of the multi-faced transducer element 310 is excited to transmit a pulse.

At 1806, the sub-element receives the corresponding echo.

At 1808, it is determined whether another sub-element is to be excited.

If so, acts 1804-1806 are repeated for the next sub-element.

At 1810, it is determined whether a scan at another position is to be performed.

If so, acts 1802-1806 are repeated for the next position.

If not, at 1812, the acquired data is processed using synthetic aperture algorithm, generating an image of the scanned object.

Figure 19:
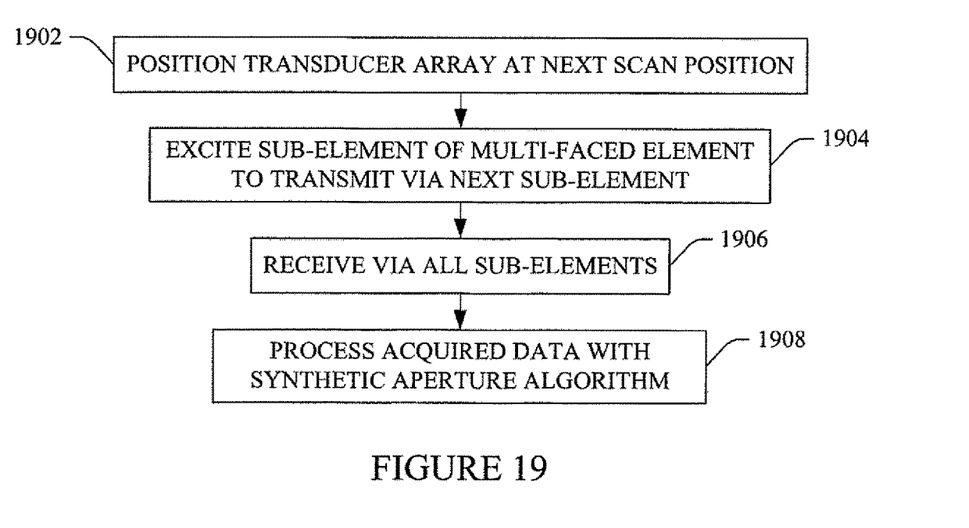
FIG. 19 illustrates another example method in accordance with the embodiments herein.

FIG. 19 illustrates a method based on the poly-static synthetic aperture approach.

It is to be appreciated that the order of the following acts is provided for explanatory purposes and is not limiting. As such, one or more of the following acts may occur in a different order. Furthermore, one or more of the following acts may be omitted and/or one or more additional acts may be added.

At 1902, the transducer array 308 is positioned at a next scan position on a scan path.

At 1904, a sub-element of the multi-faced transducer element 310 is excited to transmit a pulse.

At 1906, all the sub-element receives the corresponding echo.

At 1908, the acquired data is processed using synthetic aperture algorithm, generating an image of the scanned object.

The above may be implemented by way of computer readable instructions, encoded or embedded on computer readable storage medium such as physical memory or other non-transitory medium, which, when executed by a computer processor(s), cause the processor(s) to carry out the described acts. Additionally or alternatively, at least one of the computer readable instructions is carried by a signal, carrier wave or other transitory medium.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. An imaging system, comprising:
a transducer array, including:
a single concave transducer element with at least two faces, each face facing a different direction, the transducer element, including:
at least two sub-elements, each sub-element part of a different face, wherein the at least two sub-elements transmit respective beams at each location along a scan path and have overlapping scan regions.

2. The imaging system of claim 1, wherein a first face faces forward along an axial direction and other faces are tilted at a predetermined angle with respect to the first face.

3. The imaging system of claim 2, wherein a second face is tilted twenty to forty degrees and a third face is tilted negative twenty to forty degrees with respect to the first face.

4. The imaging system of claim 2, wherein a first sub-element faces an axial direction and second and third sub-elements face an azimuth direction.

5. The imaging system of claim 4, wherein fifth and sixth sub-elements face an elevation direction.

6. The imaging system of claim 1, wherein the transducer includes at least seven sub-elements.

7. The imaging system of claim 1, wherein the at least three sub-elements sequentially transmit and receive.

8. The imaging system of claim 1, wherein the at least three sub-elements sequentially transmit with more than one of the at least two sub-elements receiving each transmission.

9. The imaging system of claim 1, wherein the transducer array is a 360 degree, 3D transducer.

10. The imaging system of claim 1, wherein the transducer array includes at least one row of the elements and the transducer array is configured to at least one of translate, wobble or rotate for 4D imaging.

11. The imaging system of claim 1, further comprising:
a synthetic aperture processor that processes received echoes with a synthetic aperture algorithm.

12. A method, comprising:
positioning a transducer array at a scan position along a scan path,
wherein the transducer array includes at least one single concave transducer element having at least two sub-elements facing different directions and having overlapping scan regions;
exciting each of the sub-elements to transmit and receive with the array at the scan position; and
processing the received data using a synthetic aperture algorithm.

13. The method of claim 12, wherein each sub-element sequentially transmits and receives.

14. The method of claim 13, further comprising:
processing the data with a mono-static synthetic aperture algorithm.

15. The method of claim 12, wherein each sub-element sequentially transmits and all of the sub-elements receive each transmission.

16. The method of claim 15, further comprising:
processing the data with a poly-static synthetic aperture algorithm.

17. The method of claim 12, wherein the sub-element transmit pulses that do not overlap a common region.

18. The method of claim 17, wherein the sub-elements concurrently transmit and receive.

19. The method of claim 12, further comprising:
translating the transducer array to a next scan position along the scan path; and
exciting each of the sub-elements to transmit and receive with the array at the next scan position, wherein the received data from the scan position and the next scan position are processed using the synthetic aperture algorithm.

20. The method of claim 12, wherein one of the at least three sub-elements faces an axial direction and the remaining sub-elements of the at least three sub-elements face at least one of the azimuth or elevation direction.

21. The method of claim 12, wherein one of the at least three sub-elements faces an axial direction and the remaining sub-elements are tilted approximately twenty to forty degrees with respect to the one of the at least three sub-elements.

22. A transducer array, comprising:
a single concave transducer element with at least three sub-elements arranged on different faces of the transducer element, each sub-element face facing a different direction, wherein the at least three sub-elements transmit and receive at each location along a scan path, and have overlapping scan regions; and
processing the received data using a synthetic aperture algorithm.

* * * * *